US012676765B2

(12) United States Patent
Wang et al.

(10) Patent No.:  US 12,676,765 B2
(45) Date of Patent:      Jul. 7, 2026

(54) METHOD AND APPARATUS FOR EDITING BLOCK CHAIN

(71) Applicant: HUAWEI TECHNOLOGIES CO., LTD., Shenzhen (CN)

(72) Inventors: Donghui Wang, Beijing (CN); Fei Liu, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 199 days.

(21) Appl. No.: 18/513,014

(22) Filed: Nov. 17, 2023

(65) Prior Publication Data

US 2024/0089132 A1      Mar. 14, 2024

Related U.S. Application Data

(63) Continuation of application No. PCT/CN2022/084715, filed on Apr. 1, 2022.

(30) Foreign Application Priority Data

May 18, 2021    (CN) .......................... 202110540087.1

(51) Int. Cl.
    *H04L 29/06*        (2006.01)
    *H04L 9/00*         (2022.01)
    *H04L 9/30*         (2006.01)
(52) U.S. Cl.
    CPC .  *H04L 9/50* (2022.05); *H04L 9/30* (2013.01)
(58) Field of Classification Search
    CPC . H04L 9/50; H04L 9/30; H04L 9/0643; H04L 2209/38; H04L 9/0637;

(Continued)

(56) References Cited

U.S. PATENT DOCUMENTS

2019/0019168 A1*    1/2019    Wu ..................... G06F 21/6254
2019/0236562 A1*    8/2019    Padmanabhan ......... H04L 63/00

(Continued)

FOREIGN PATENT DOCUMENTS

CN        109417479 A      3/2019
CN        110457297 A      11/2019
CN        111159306 A      5/2020

OTHER PUBLICATIONS

G. Ateniese, B. Magri, D. Venturi and E. Andrade, "Redactable Blockchain-or-Rewriting History in Bitcoin and Friends," 2017 IEEE European Symposium on Security and Privacy (EuroS&P), Paris, France, 2017, pp. 111-126, doi: 10.1109/EuroSP.2017.37. (Year: 2017).*

(Continued)

*Primary Examiner* — Malcolm Cribbs
(74) *Attorney, Agent, or Firm* — HAUPTMAN HAM, LLP

(57) ABSTRACT

This application provides a method and an apparatus for editing a block chain. The method for editing a block chain includes: A first node receives a request message used to request to edit data, and performs endorsement on the request message to generate an endorsement result. Further, the first node sends the endorsement result to each of at least one second node, where the at least one second node belongs to a second node set. The node with the endorsement function in the block chain performs endorsement on an editing request, and sends an endorsement result to a node with an editing function, to implement block chain editing while improving security assurance.

11 Claims, 7 Drawing Sheets

Block #1           Block #2          Block #3

(58) Field of Classification Search
CPC ... H04L 9/0618; H04L 9/3247; H04L 9/3239;
H04L 9/3263; H04L 2209/56; H04L
9/0656; G06F 21/62; G06F 21/6209;
G06F 21/6218; G06F 21/6227; G06F
21/64; G06F 16/1824; G06F 21/44; G06F
21/629; G06F 16/2379; G06F 16/9027;
G06Q 20/06; G06Q 20/382; G06Q
20/401; G06Q 2220/00; G06Q 20/381;
G06Q 40/04; G06Q 20/3825; G06Q
20/3827; G06K 9/00577; G06K
2009/00583
See application file for complete search history.

(56) References Cited

U.S. PATENT DOCUMENTS

| | | | | |
|---|---|---|---|---|
| 2020/0084027 | A1* | 3/2020 | Duchon | G06F 21/602 |
| 2020/0320529 | A1* | 10/2020 | Lyadvinsky | H04L 9/3239 |
| 2021/0065180 | A1* | 3/2021 | Emaru | G06Q 20/202 |

OTHER PUBLICATIONS

Alexander Marsalek et al:"A Correctable Public Blockchain", Aug. 1, 2019, total 8 pages.
International Search Report issued in corresponding International Application No. PCT/CN2022/084715, dated Jun. 8, 2022, pp. 1-10.
Weilong Lv et al:"Verifiable Blockchain Redacting Method for a Trusted Consortium with Distributed Chameleon Hash Authority." Dec. 11, 2020. total 12 pages.
Giuseppe Ateniese et al:"Redactable Blockchain or Rewriting History in Bitcoin and Friends." May 11, 2011. total 38 pages.
Philipp Schindler et al:"ETHDKG: Distributed Key Generation with Ethereum Smart Contracts." Aug. 29, 2019. total 14 pages.
Extended European Search Report issued in corresponding European Application No. 22803662.0, dated Sep. 17, 2024, pp. 1-9.

* cited by examiner

METHOD AND APPARATUS FOR EDITING BLOCK CHAIN

CROSS-REFERENCE TO RELATED APPLICATIONS

This application is a continuation of International Application No. PCT/CN2022/084715, filed on Apr. 1, 2022, which claims priority to Chinese Patent Application No. 202110540087.1, filed on May 18, 2021. The disclosures of the aforementioned applications are hereby incorporated by reference in their entireties.

TECHNICAL FIELD

This application relates to the field of information technologies, and more specifically, to a method and an apparatus for editing a blockchain.

BACKGROUND

A blockchain (blockchain, BC) may be understood as a tamper-proof decentralized ledger for recording transactions (transactions, TXs) in a network. Specifically, the transactions are generated and stored in a unit of a block (block), and are connected in a chain (chain) structure in a time sequence. The transactions are recorded by using the block. Blocks are linked through a hash algorithm to record historical records of transactions between peer nodes in the network. A confirmed and proven transaction is linked from a start block of the blockchain to a latest block.

There are some contradictions between a characteristic that the blockchain cannot be tampered with and an actual blockchain application scenario. For example, due to the characteristic that the blockchain cannot be tampered with, malicious information may cause a large-scale, continuous, or even permanent negative impact. The blockchain may become an effective way to avoid supervision and release the malicious information.

To resolve the foregoing contradictions, a method for editing a blockchain is provided. For example, a chameleon hash function is used to rewrite a block. However, the method for editing a blockchain currently proposed still has some disadvantages in security consideration. Therefore, how to edit a blockchain while considering security becomes an urgent problem to be resolved.

SUMMARY

This application provides a method and an apparatus for editing a blockchain. A node with an endorsement function in a blockchain performs endorsement on an editing request, and sends an endorsement result to a node with an editing function, to implement blockchain editing while improving security assurance.

According to a first aspect, a method for editing a blockchain is provided. The method for editing a blockchain may be performed by a first node, or may be performed by a chip or a circuit disposed on the first node. This is not limited in this application.

The method for editing a blockchain includes the following steps:

The first node receives a request message, where the request message is used to request to edit data, and the data includes a transaction or a block. The first node performs endorsement on the request message to generate an endorsement result. The first node sends the endorsement result to each of at least one second node, where the at least one second node belongs to a second node set. The first node is any one of a plurality of nodes with an endorsement function in a blockchain, each of the at least one second node knows a private key slice corresponding to the second node and a public key corresponding to the second node set, and the public key is determined based on at least one public key slice respectively corresponding to the at least one second node.

According to the method for editing a blockchain provided in embodiments of this application, a node with an endorsement function in the blockchain performs endorsement on an editing request, and sends an endorsement result to a node with an editing function, to implement blockchain editing while improving security assurance.

With reference to the first aspect, in some implementations of the first aspect, before that the first node sends the endorsement result to each of at least one second node, the method further includes: The first node determines the second node set based on the data; or the first node determines the second node set based on an identifier, where the identifier is carried in the request message, and the identifier indicates the second node set.

According to the method for editing a blockchain provided in embodiments of this application, the first node may determine the second node set through data that needs to be modified and/or the identifier of the second node set, to provide a flexible solution for determining the second node set.

With reference to the first aspect, in some implementations of the first aspect, the method further includes: The first node verifies a hash collision based on a first hash value and a first random number. The first hash value and the first random number are obtained based on at least one second hash value and at least one second random number, and the at least one second hash value and the at least one second random number are calculated by each of the at least one second node based on a chameleon hash private key slice corresponding to the second node.

According to the method for editing a blockchain provided in embodiments of this application, the node in the blockchain verifies the hash collision, to improve security of the solution.

With reference to the first aspect, in some implementations of the first aspect, before that a first node receives a request message, the method further includes: The first node receives the data; and the first node verifies the data based on the public key, where the verification includes performing hash calculation and signing based on the public key.

The method for editing a blockchain provided in embodiments of this application further provides a data on-chain procedure.

With reference to the first aspect, in some implementations of the first aspect, before that the first node verifies the data based on the public key, the method further includes: The first node determines the second node set; and the first node determines the public key based on the second node set.

According to the method for editing a blockchain provided in embodiments of this application, a key used by an endorsement node for verification is determined based on an editing node set, to improve the security of the solution.

With reference to the first aspect, in some implementations of the first aspect, that the first node determines the second node set includes: The first node determines the second node set based on preconfigured information, where the preconfigured information indicates that the data corresponds to the second node set; or the first node determines the second node set based on the identifier, where the identifier indicates the second node set.

According to the method for editing a blockchain provided in embodiments of this application, the first node may determine the second node set by using preconfigured information and/or the identifier of the second node set, to provide a flexible solution for determining the second node set.

With reference to the first aspect, in some implementations of the first aspect, the method further includes: The first node sends a response message to a client, where the response message includes an editing result corresponding to the data.

According to the method for editing a blockchain provided in embodiments of this application, the first node may notify the client after editing is completed.

With reference to the first aspect, in some implementations of the first aspect, the blockchain includes a consortium blockchain.

Specifically, the blockchain in this application is the consortium blockchain.

According to a second aspect, a method for editing a blockchain is provided. The method for editing a blockchain may be performed by a client, or may be performed by a chip or a circuit disposed in the client. This is not limited in this application.

The method for editing a blockchain includes the following steps:

A client sends a request message to each of a plurality of nodes, where the request message is used to request to edit data, the data includes a block or a transaction, the request message includes an identifier, and the identifier indicates a second node set. The client receives a response message from each of the plurality of nodes, where the response message includes an editing result corresponding to the data. The second node set includes at least one second node, each of the at least one second node knows a private key slice (tki) corresponding to the second node and a public key corresponding to the second node set, and the public key is determined based on at least one public key slice (hki) respectively corresponding to the at least one second node.

According to the method for editing a blockchain provided in embodiments of this application, when the client needs to modify data, the client may send a request message to a node with an endorsement function, and include, in the request message, an identifier indicating an editing node set, so that the node with the endorsement function in the blockchain performs endorsement on an editing request, and sends an endorsement result to a node with an editing function, to implement blockchain editing while improving security assurance.

With reference to the second aspect, in some implementations of the second aspect, before that the client sends a request message to each of the plurality of nodes, the method further includes: The client sends the data to each of the plurality of nodes; and the client receives a verification result from each of the plurality of nodes, where the verification result includes a result of performing hash calculation and signing based on the public key.

The method for editing a blockchain provided in embodiments of this application further provides a data on-chain procedure.

According to a third aspect, a method for editing a blockchain is provided. The method for editing a blockchain may be performed by a second node, or may be performed by a chip or a circuit disposed in the second node. This is not limited in this application.

The method for editing a blockchain includes the following steps:

The second node generates a private key slice and a public key slice that correspond to the second node. The second node sends the public key slice corresponding to the second node to other second nodes than the second node in a second node set. The second node receives a public key slice that corresponds to each of the other second nodes and that is sent by each of the other second nodes than the second node in the second node set. The second node calculates a public key corresponding to the second node set based on a public key slice corresponding to each of at least one second node in the second set. The second node sends the public key to nodes in the blockchain.

According to the method for editing a blockchain provided in embodiments of this application, a key required for endorsement or verification is provided by an editing node, thereby improving security of the solution.

With reference to the third aspect, in some implementations of the third aspect, the method further includes: The second node receives an endorsement result that is of a request message and that is sent by each of a plurality of nodes, where the request message is used to request to edit data, and the data includes a transaction or a block. After determining that a quantity of received endorsement results satisfies a preset value, the second node calculates, based on the private key slice corresponding to the second node, a second hash value and a second random number that correspond to the second node. The second node receives a second hash value and a second random number that correspond to each of the other second nodes than the second node in the second node set and that are sent by each of the other second nodes. The second node calculates a first hash value and a first random number based on the second hash value and the second random number that correspond to each of the at least one second node in the second set. The second node sends the first hash value and the first random number to the nodes in the blockchain. The plurality of nodes are nodes that verify the transaction in the blockchain.

According to a fourth aspect, an apparatus for editing a blockchain is provided. The apparatus for editing a blockchain includes a processor, configured to implement a function of the first node in the method described in the first aspect.

Optionally, the apparatus for editing a blockchain may further include a memory, the memory is coupled to the processor, and the processor is configured to implement the function of the first node in the method described in the first aspect.

In a possible implementation, the memory is configured to store program instructions and data. The memory is coupled to the processor, and the processor may invoke and execute the program instructions stored in the memory, to implement the function of the first node in the method described in the first aspect.

Optionally, the apparatus for editing a blockchain may further include a communication interface. The communication interface is used by the apparatus for editing a blockchain to communicate with another device. When the apparatus for editing a blockchain is the first node, the communication interface may be a transceiver, an input/output interface, a circuit, or the like.

In a possible design, the apparatus for editing a blockchain includes a processor and a communication interface.

The processor is configured to run a computer program, to enable the apparatus for editing a blockchain to implement any method described in the first aspect.

The processor communicates with the outside through the communication interface.

It may be understood that the outside may be an object other than the processor or an object other than the apparatus.

In another possible design, the apparatus for editing a blockchain is a chip or a chip system. The communication interface may be an input/output interface, an interface circuit, an output circuit, an input circuit, a pin, a related circuit, or the like in the chip or the chip system. The processor may alternatively be embodied as a processing circuit or a logic circuit.

According to a fifth aspect, an apparatus for editing a blockchain is provided. The apparatus for editing a blockchain includes a processor, configured to implement a function of the client in the method described in the second aspect.

Optionally, the apparatus for editing a blockchain may further include a memory, the memory is coupled to the processor, and the processor is configured to implement the function of the client in the method described in the second aspect.

In a possible implementation, the memory is configured to store program instructions and data. The memory is coupled to the processor, and the processor may invoke and execute the program instructions stored in the memory, to implement a function of the client in the method described in the second aspect.

Optionally, the apparatus for editing a blockchain may further include a communication interface. The communication interface is used by the apparatus for editing a blockchain to communicate with another device. When the apparatus for editing a blockchain is a client, the communication interface may be a transceiver, an input/output interface, a circuit, or the like.

In a possible design, the apparatus for editing a blockchain includes a processor and a communication interface. The processor is configured to run a computer program, to enable the apparatus for editing a blockchain to implement any method described in the first aspect.

The processor communicates with the outside through the communication interface.

It may be understood that the outside may be an object other than the processor or an object other than the apparatus.

In another possible design, the apparatus for editing a blockchain is a chip or a chip system. The communication interface may be an input/output interface, an interface circuit, an output circuit, an input circuit, a pin, a related circuit, or the like in the chip or the chip system. The processor may alternatively be embodied as a processing circuit or a logic circuit.

According to a sixth aspect, an apparatus for editing a blockchain is provided. The apparatus for editing a blockchain includes a processor, configured to implement a function of the second node in the method described in the third aspect.

Optionally, the apparatus for editing a blockchain may further include a memory, the memory is coupled to the processor, and the processor is configured to implement the function of the second node in the method described in the third aspect and the fourth aspect.

In a possible implementation, the memory is configured to store program instructions and data. The memory is coupled to the processor, and the processor may invoke and execute the program instructions stored in the memory, to implement the function of the second node in the method described in the third aspect.

Optionally, the apparatus for editing a blockchain may further include a communication interface. The communication interface is used by the apparatus for editing a blockchain to communicate with another device. When the apparatus for editing a blockchain is the second node, the communication interface may be a transceiver, an input/output interface, a circuit, or the like.

In a possible design, the apparatus for editing a blockchain includes a processor and a communication interface.

The processor communicates with the outside through the communication interface.

The processor is configured to run a computer program, to enable the apparatus for editing a blockchain to implement any method described in the third aspect.

It may be understood that the outside may be an object other than the processor or an object other than the apparatus.

In another possible design, the apparatus for editing a blockchain is a chip or a chip system. The communication interface may be an input/output interface, an interface circuit, an output circuit, an input circuit, a pin, a related circuit, or the like in the chip or the chip system. The processor may alternatively be embodied as a processing circuit or a logic circuit.

According to a seventh aspect, this application provides a non-transitory computer-readable storage medium. The computer-readable storage medium stores instructions, and when the instructions are run on a computer, the computer is enabled to perform the method according to the foregoing aspects.

According to an eighth aspect, this application provides a computer program product including instructions. When the computer program product runs on a computer, the computer is enabled to perform the method according to the foregoing aspects.

According to a ninth aspect, a communication system is provided. The communication system includes the apparatus for editing a blockchain shown in the fourth aspect to the sixth aspect.

According to a tenth aspect, a chip apparatus is provided. The chip apparatus includes a processing circuit. The processing circuit is configured to invoke a program from a memory and run the program, to enable a communication device in which the chip apparatus is installed to perform the method according to any possible implementation of the first aspect to the third aspect.

7 8

Figure 8:
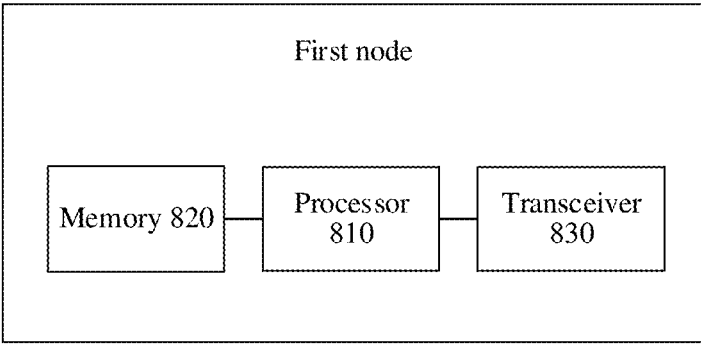
Figure 9:
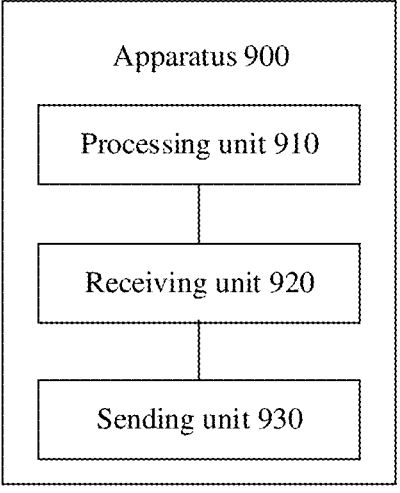
Figure 10:
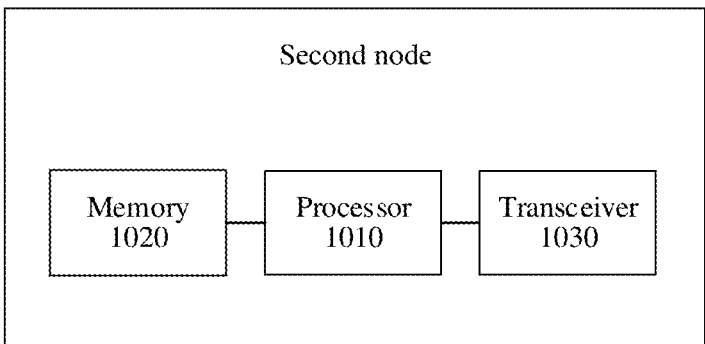
Figure 11:
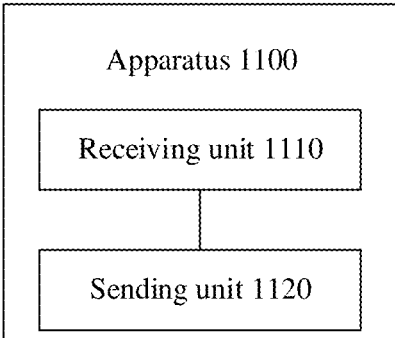
Figure 12:
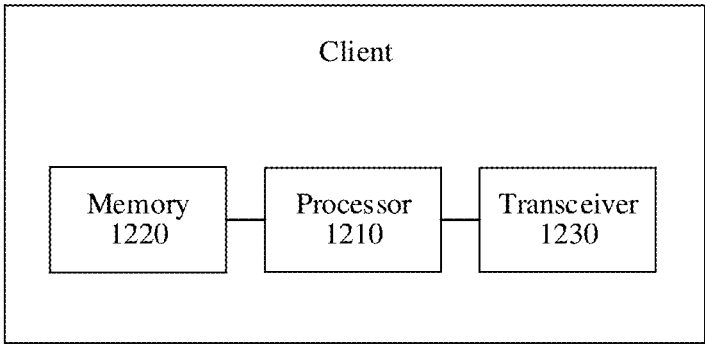

FIG. 8 is a schematic structural diagram of a first node applicable to at least one embodiment of this application;

FIG. 9 is a schematic diagram of an apparatus 900 for editing a blockchain according to this application;

FIG. 10 is a schematic structural diagram of a second node applicable to at least one embodiment of this application;

FIG. 11 is a schematic diagram of an apparatus 1100 for editing a blockchain according to this application; and FIG. 12 is a schematic structural diagram of a client applicable to at least one embodiment of this application.

DESCRIPTION OF EMBODIMENTS

The following describes technical solutions in this application with reference to the accompanying drawings. Apparently, the described embodiments are merely some but not all of embodiments of this application. All other embodiments obtained by a person of ordinary skill in the art based on embodiments of this application without creative efforts shall fall within the protection scope of this application.

Figure 1:
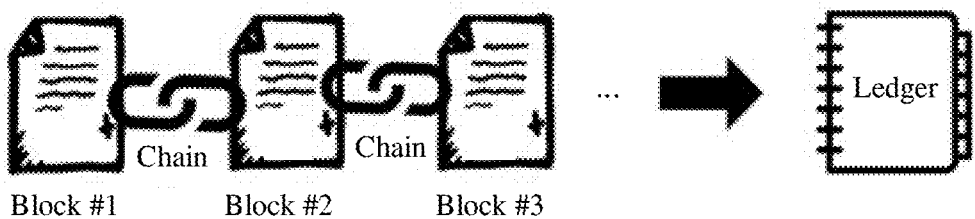
FIG. 1 is a schematic diagram of a blockchain.

The technical solutions in embodiments of this application relate to a blockchain. The following briefly describes the blockchain with reference to FIG. 1 and FIG. 2. FIG. 1 is a schematic diagram of the blockchain.

It can be learned from FIG. 1 that transactions in a network are generated and stored in a unit of a block, and are connected in a chain structure in a time sequence. A confirmed and proven transaction in the network is linked from a start block of the blockchain to a latest block. A ledger formed by linking a plurality of blocks (a block #1, a block #2, and a block #3 shown in FIG. 1) is referred to as the blockchain.

Figure 2:
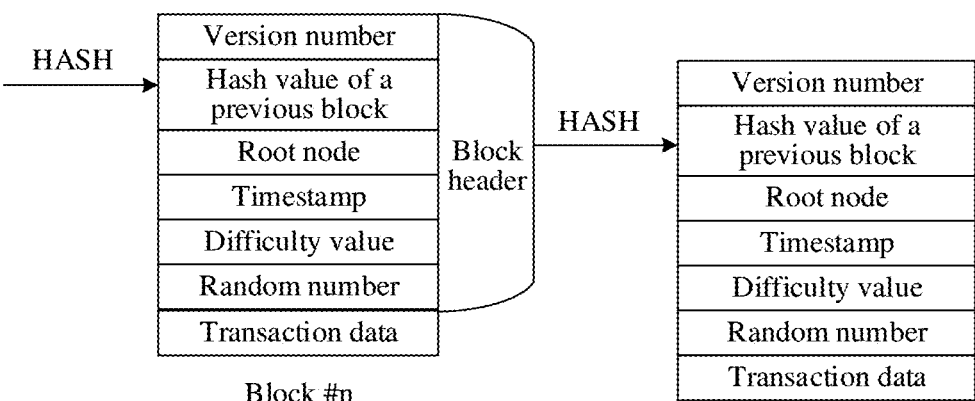
FIG. 2 is a schematic diagram of a link manner between blocks.

FIG. 2 is a schematic diagram of a link manner between blocks.

It can be learned from FIG. 2 that blocks are linked through a hash (HASH) algorithm.

A blockchain technology implements a chain data structure formed by sequentially connecting data and information blocks in the time sequence, and implements distributed storage that cannot be tampered with and cannot be forged in a cryptographic manner. Generally, data and information in the blockchain are referred to as a "transaction".

The blockchain technology is not a single technology, but a system that integrates point-to-point transmission, a consensus mechanism, distributed data storage, and a cryptography principle. The system is fully open and tamper-proof.

1. Point-to-point transmission: Nodes participating in the blockchain are independent and peer-to-peer, and data and information are synchronized between nodes through the point-to-point transmission technology. The nodes may be different physical machines, or may be different instances on the cloud.

2. Consensus mechanism: The consensus mechanism of the blockchain refers to that a process in which nodes participating in a plurality of parties agree on specific data and information through interaction between the nodes according to a preset logical rule. The consensus mechanism needs to depend on a well-designed algorithm. Therefore, different consensus mechanisms have different performance (for example, a transaction throughput transaction per second (transaction per second, TPS), a delay for reaching a consensus, a consumed computing resource, and a consumed transmission resource).

3. Distributed data storage: Distributed storage in the blockchain refers to that each node participating in the blockchain stores independent and complete data, thereby ensuring that data storage is fully open between nodes. Different from traditional distributed data storage which divides data into a plurality of copies for backup or synchronous storage according to a specific rule, blockchain distributed data storage implements highly consistent data storage based on the consensus between independent nodes in the blockchain.

4. Cryptography principle: The blockchain usually implements trusted information transmission and verification based on an asymmetric encryption technology.

A concept of "block" is to organize one or more data records in a form of a "block", and a size of the "block" may be customized based on an actual application scenario. A "chain" is a data structure, and the data structure connects "blocks" for data record storage in the time sequence and by using a hash technology. In the blockchain, each "block" includes two parts: a "block header" and a "block body". The "block body" includes a transaction record packed into the "block". The "block header" includes root hashes of all transactions in the "block" and a hash of a previous "block". The data structure of the blockchain ensures that data stored on the blockchain cannot be tampered with.

Currently, blockchains can be classified into three types: public blockchains, consortium blockchains, and private blockchains.

The public blockchain refers to that any accounting node (peer) can be used as a consensus node (which may also be referred to as a consensus computing node) of the blockchain, to participate in consensus computing of data storage in the blockchain and maintain the blockchain anonymously. Nodes do not trust each other.

For the consortium blockchain, an access permission is added based on the public blockchain, so that only a qualified node can be used as the consensus computing node of the blockchain to participate in the consensus computing of data storage in the blockchain and maintain the blockchain. Nodes trust each other.

Compared with the consortium blockchain, the private blockchain has a stricter admission mechanism. Therefore, the blockchain and the consensus computing node of the blockchain are privately exclusive.

Figure 3:
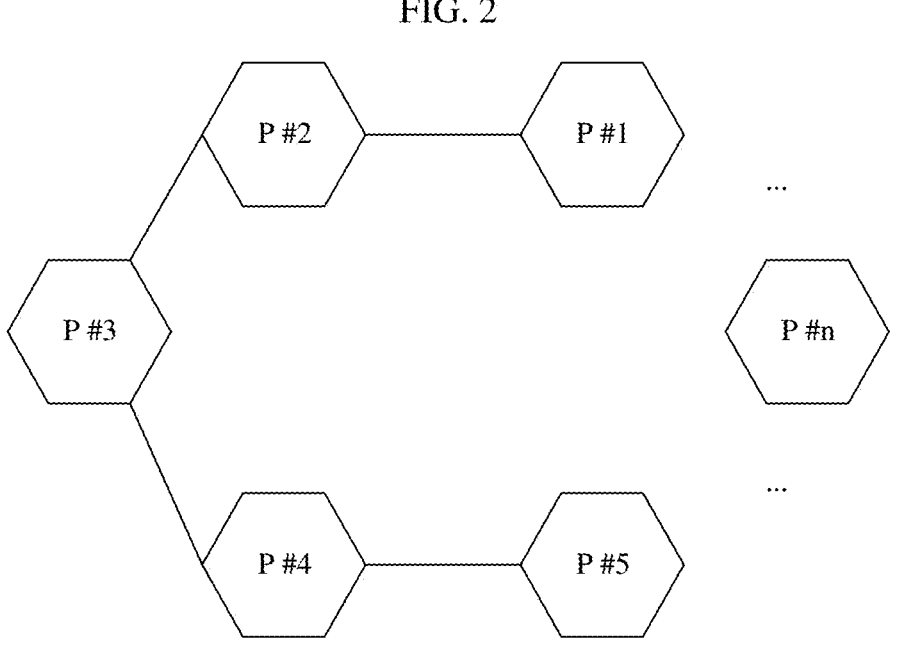
FIG. 3 is a schematic diagram of nodes included in a consortium blockchain.

Embodiments of this application are mainly applied to the consortium blockchain. The following briefly describes a structure of a current consortium blockchain with reference to FIG. 3. FIG. 3 is a schematic diagram of nodes included in the consortium blockchain.

As shown in FIG. 3, the consortium blockchain includes peer nodes (as shown in FIG. 3, the peer nodes include P #1, P #2, P #3, P #4, P #5, . . . , and P #n). The peer nodes carry a ledger (ledger) and a smart contract (smart contract). A transaction process is recorded in a tamper-proof manner through the ledger. In the consortium blockchain, the smart contract and the ledger are used to encapsulate shared processing and shared information in an entire network.

It should be noted that each peer node may carry one or more ledgers and one or more smart contracts.

For the consortium blockchain, the foregoing peer nodes are further classified into endorsement nodes, accounting nodes, and sorting nodes. The endorsement node is bound to a contract (contract), checks and performs endorsement on a proposal (proposal) of the transaction, and calculates a transaction execution result. All peer nodes are accounting nodes, and are configured to re-check a modification of a valid transaction to the ledger and write the modification to the blockchain before receiving the transaction result. The sorting node performs sorting on the transaction sent to the network, sorts the sorted transactions into blocks based on a configuration agreement, and submits the blocks to a confirmation node for processing.

It should be understood that FIG. 1 and FIG. 2 are merely examples for describing the blockchain technology in embodiments of this application, and FIG. 3 is merely an example for indicating that the consortium blockchain includes a plurality of nodes. This does not constitute any limitation on the protection scope of this application. For specific definitions of the blockchain and the consortium blockchain, refer to related descriptions in the current technologies. Details are not described in this application.

It can be learned from the foregoing that the blockchain has characteristics of openness, transparency, and tamper-proofness. The tamper-proofness of the blockchain may cause some problems during actual blockchain deployment. Details are as follows:

1. From a perspective of information security, currently, a research and application of the blockchain focus more on security of data storage and transmission on the blockchain, but ignore security of information content. Details are as follows:

(1) There is no necessary mechanism for reviewing and evaluating on-chain information. A verifier of a blockchain system focuses on syntax correctness of the on-chain information, but ignores semantic rationality and even authenticity of the information content.

(2) A data search and identification mechanism on the blockchain is not perfect. When there are harmful and potentially illegal files, images, and links on the blockchain, it is necessary to modify illegal data.

(3) Due to the openness, transparency, and tamper-proofness of the blockchain, malicious information brings a large-scale, continuous, or even permanent negative impact. The blockchain may become an effective way to avoid supervision and release the malicious information.

2. Attacks that can be resolved only by hard bifurcation: The blockchain and the smart contract on the chain are essentially software code, and vulnerabilities are inevitable. Attackers may exploit these vulnerabilities to launch attacks, such as stealing virtual currency and digital assets by exploiting the vulnerabilities. Because the blockchain cannot be modified, attack results cannot be mitigated.

3. There is a contradiction between the right to forget data in a general data protection regulation (general data protection regulation, GDPR) and the non-modification of the blockchain.

From a perspective of privacy protection, the GDPR stipulates that a data subject has "a right to be forgotten" and "a right to data portability". The data subject has the right to ask a data controller to erase personal data of the data subject, stop further transmission of data, and request a third party to stop processing data.

In particular, in the future, a communication network faces a large quantity of personal data of users, devices, or vendors, and privacy issues are severe. This conflict greatly restricts the exploration, use, and deployment of a future communication network of the blockchain.

Figure 4:
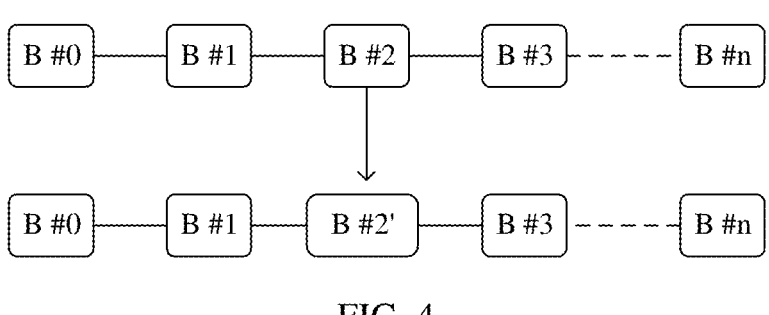
FIG. 4 is a schematic diagram of a block rewriting method.

To resolve the foregoing problem caused by the tamper-proofness of the blockchain, a block rewriting method is proposed. In the method, a chameleon hash function is used to rewrite the block. The chameleon hash is a special hash function. The chameleon hash function has a trapdoor. An owner of the trapdoor may use the trapdoor to calculate new content, so that the new content has a same hash value as original content, that is, a hash collision occurs. As shown in FIG. 4, FIG. 4 is a schematic diagram of a block rewriting method.

It can be learned from FIG. 4 that an original blockchain includes blocks B #0, B #1, B #2, B #3, . . . , and B #n. When a block B #2 needs to be replaced, a blockchain node calculates a block B #2' through the trapdoor, so that Hash(B #2)=Hash(B #2'), and replaces B #2 with B #2'.

In the method shown in FIG. 4, the chameleon hash is used to update the block. However, security is not fully considered, and there are still some disadvantages. In addition, the block rewriting method uses a single trapdoor mechanism, and the owner of the trapdoor has the right to modify the block.

To edit the blockchain on the premise of considering security, this application provides a method for editing a blockchain. A node with an endorsement function in the blockchain performs endorsement on an editing request, and sends an endorsement result to a node with an editing function, to implement blockchain editing while improving security assurance.

For ease of understanding of embodiments of this application, several basic concepts in embodiments of this application are briefly described. It should be understood that the basic concepts described below are briefly described by using the basic concepts in related descriptions of a current blockchain as an example. However, embodiments of this application are not limited to being used in only an existing blockchain-related technology. Therefore, this application does not limit a specific name of the term, and may be correspondingly extended to another blockchain-related technology, for example, a future blockchain-related technology.

1. Chameleon Hash (Chameleon Hash) Function.

The chameleon hash function includes four parts: cham_hash=(Setup,KeyGen,Hash,Forge). Setup($\lambda$) indicates that a security parameter $\lambda$ is inputted and a public parameter pp is outputted. KeyGen(pp) indicates that a public parameter pp is inputted and a pair of public and private keys (HK,CK) are outputted, where HK is a public key, CK is a private key, which is also referred to as a threshold. Hash(HK,m,r) indicates that a public key HK, a message m, and a random number r are inputted and a chameleon hash value CH is outputted. Forge(CK,m,r,m') indicates that a private key CK, a message m, a random number r, and a message m' are inputted, another random number r' is outputted, and CH=Hash(HK,m,r)=Hash(HK, m',r') is satisfied.

The chameleon hash satisfies the following security requirements:

Anti-collision: There is no valid algorithm by using which (m1,r1) and (m2,r2) can be found when a public key HK is input. m1 #m2, and Hash(HK,m1,r1)=Hash(HK,m2,r2) is satisfied.

Trapdoor collision: There is an effective algorithm by using which r2 can be calculated for any m1 or r1, if m2 is given and after the threshold CK is inputted. Hash(HK,m1, r1)=Hash(HK,m2,r2) is satisfied.

Semantic security: For any message m1, m2, the probability distribution of Hash(HK,m1,r1) and Hash(HK,m2,r2) is indistinguishable. In particular, when r is randomly selected, no information about m can be obtained from Hash(HK,m,r).

Compared with the traditional hash function, which is difficult to find a collision, the chameleon hash function may set a "weakness" or "backdoor" to easily find the hash collision. To some extent, two collision characteristics of the hash function are damaged, and the characteristic that a hash function-based blockchain cannot be tampered with is also damaged. However, the application scenario of the blockchain is expanded. In addition, for a common user who does not know a threshold, it is still impossible to find the collision. That is, security of the chameleon hash may be ensured. For an administrator with the "backdoor", if the administrator arbitrarily tampers with the block, verification may also be performed by verifying whether hashes of two blocks are equal.

2. Smart Contract.

The smart contract is a computer protocol designed to spread, verify, or execute a contract in an informational manner. All users on the blockchain can view the smart contract based on the blockchain. However, in this case, all vulnerabilities, including security vulnerabilities, are visible and may not be fixed quickly.

The smart contract in the field of the blockchain has the following characteristics:

Rules are open and transparent, and the rules and data in the contract are visible to external parties. All transactions are open and visible, and no false or hidden transactions exist.

The blockchain technology has characteristics of openness, transparency, and tamper-proofness, which are given to the blockchain by the smart contract. The smart contract allows trusted transactions to be performed without a third party. These transactions are traceable and irreversible. The smart contract is based on data that cannot be tampered with and can automatically execute pre-defined rules and clauses.

3. Consensus Mechanism.

The consensus mechanism is used to reach a consensus among all accounting nodes to determine validity of a record. This is a means of both identification and tampering prevention. The blockchain proposes four different consensus mechanisms. The four different consensus mechanisms are applicable to different application scenarios and achieve a balance between efficiency and security.

4. On-Chain Transaction.

The on-chain transaction is packaged into a block through the consensus mechanism to form a new block, and is linked to a previous block to become a transaction that cannot be tampered with on the chain.

5. Endorsement.

The endorsement in the blockchain may be understood as a process and a mechanism in which the endorsement node that undertakes an endorsement task performs transaction information verification on a blockchain transaction, and declares that a transaction on which the verification succeeds is valid.

6. Endorsement Verification.

Transactions first need to be endorsed by the endorsement node, then the transactions are sorted, and finally the ledger is updated by using the sequential transactions. An endorsement policy verification process includes the following steps.

When a transaction is initiated, an initiator application generally invokes a software development kit (software development kit, SDK) to send a transaction proposal to one or more endorsement nodes for endorsement verification. The endorsement node that receives the proposal is specified in a transaction proposal request of the SDK. If the endorsement node is not specified, the transaction proposal request is sent to all nodes that join a channel (channel). After the request is sent, a client application waits for a feedback of the endorsement node.

After receiving the proposal, the endorsement node verifies the signature by using the public key of the client (SDK), checks whether the client can perform operations on the channel, whether the transaction has been submitted, and whether a transaction proposal organization is correct, and so on. After the verification succeeds, the endorsement node simulates the execution of chaincode (chaincode) to generate a proposal result, and performs endorsement on the result, that is, adds a digital signature to the result and uses the private key to sign the result.

After receiving plenty of results of the endorsement node, where the results indicate that the transaction has been correctly endorsed, the client (SDK) then packages the transaction proposal, a simulation result, and endorsement information to the sorting node. If the client does not collect plenty of endorsement information fed back by the endorsement node, the transaction is discarded.

The sorting node performs sorting on the information from the client (SDK), creates a block, and broadcasts the block on the channel.

After receiving a transaction block, the peer node on the channel verifies whether the endorsement policy is satisfied, and then updates the ledger. In this case, the endorsement policy verification process is completed.

The foregoing describes problems existing in the current method for editing a blockchain with reference to the accompanying drawings, and briefly describes some basic concepts in this application. The following further describes in detail technical solutions provided in this application with reference to the accompanying drawings.

A specific structure of an execution body of the method provided in embodiments of this application is not particularly limited in the following embodiments, provided that a program that records code of the method provided in embodiments of this application can be run to edit (or rewrite or modify) the blockchain based on the method provided in embodiments of this application. For example, the execution body of the method provided in embodiments of this application may be a computer, a server, or a functional module that can invoke and execute a program in the computer or the server.

For ease of understanding of embodiments of this application, the following descriptions are provided.

First, in this application, "used to indicate" may be understood as "enable", and "enable" may include direct enabling and indirect enabling. When a piece of information is described to enable A, the information may directly enable A or indirectly enable A, but it does not indicate that A is definitely carried in the information.

Information enabled by information is referred to as to-be-enabled information. In a specific implementation process, there are many manners of enabling the to-be-enabled information. By way of example and not limitation, the to-be-enabled information may be directly enabled, for example, the to-be-enabled information or an index of the to-be-enabled information is enabled. Alternatively, the to-be-enabled information may be indirectly enabled by enabling another information, where an association relationship exists between the another information and the to-be-enabled information. Alternatively, only a part of the to-be-enabled information may be enabled, where another part of the to-be-enabled information may be known or pre-agreed. For example, specific information may be enabled by using a pre-agreed (for example, specified in a protocol) arrangement order of each piece of information, so as to reduce enabling overheads to some extent. In addition, common parts of pieces of information may be identified and enabled in a unified manner, so as to reduce the enabling overheads caused by enabling a same piece of information separately.

Second, "first", "second", and various numerical numbers (for example, "#1", and "#2") shown in this application are merely for ease of description, and are used to distinguish between objects, but are not intended to limit the scope of embodiments of this application. For example, different blocks are distinguished, but are not used to describe a particular order or sequence. It should be understood that the objects described in this way are interchangeable in a proper circumstance, so that a solution other than embodiments of this application can be described.

Third, in this application, "preset" may include predefined, for example, defined in protocols. "Pre-defined" may be implemented by storing corresponding code or a table in a device (for example, the device includes nodes) in advance, or may be implemented in another manner that may be used to indicate related information. A specific implementation of "pre-defined" is not limited in this application.

Fourth, "being stored" in embodiments of this application may refer to "stored in one or more memories". The one or more memories may be separately disposed, or may be integrated into an encoder or a decoder, a processor, or a communication apparatus. Alternatively, a part of the one or more memories may be separately disposed, and a part of the one or more memories are integrated into the translator, the processor, or the communication apparatus. A type of the memory may be a storage medium in any form. This is not limited in this application.

Without loss of generality, the following describes in detail the method for editing a blockchain provided in embodiments of this application by using interaction between nodes in the blockchain as an example.

Figure 5:
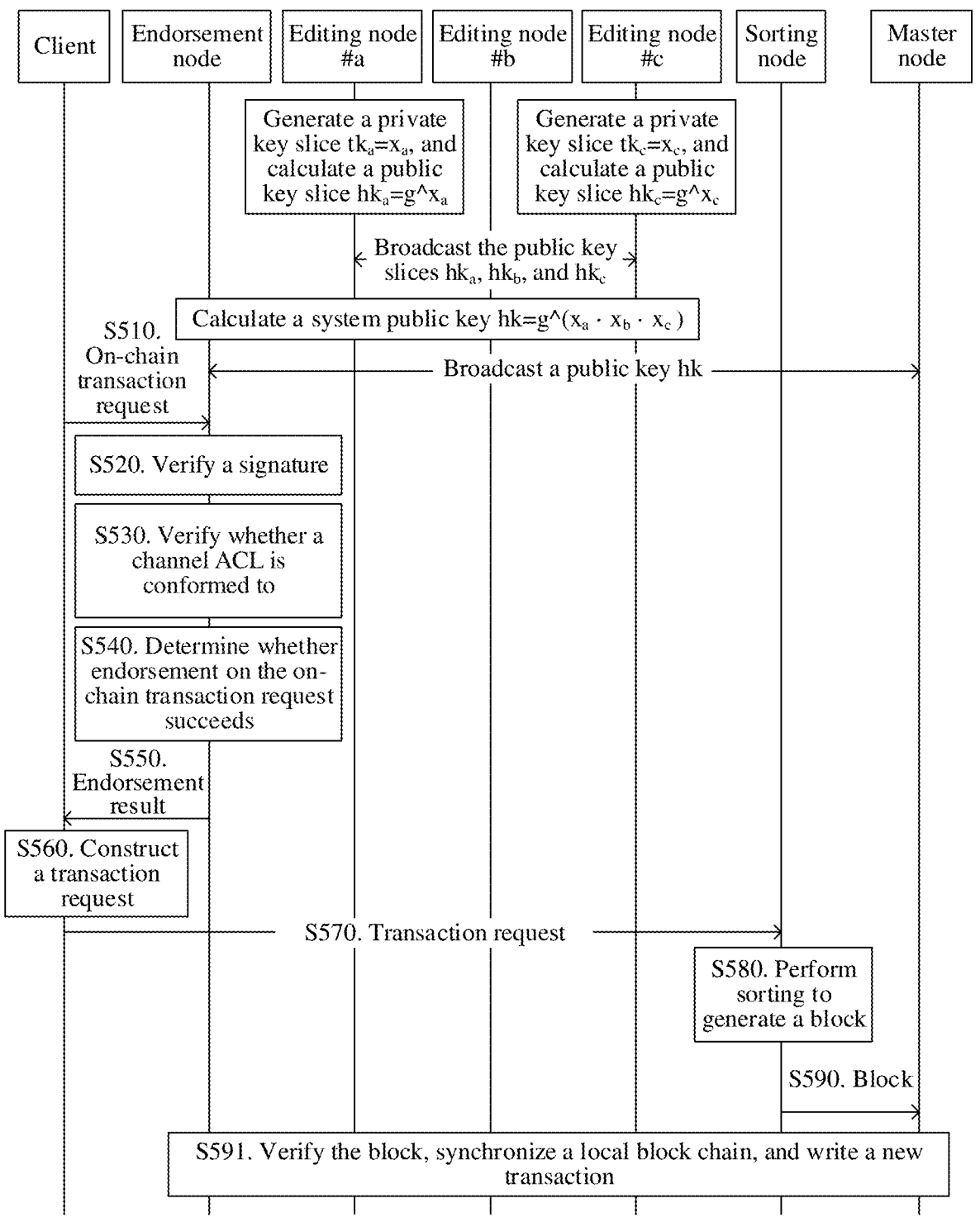
FIG. 5 is a schematic flowchart of an on-chain transaction according to this application.

For ease of understanding of the method for editing a blockchain provided in this application, the following first describes an on-chain transaction procedure in this application with reference to FIG. 5.

FIG. 5 is a schematic flowchart of an on-chain transaction according to this application. The procedure includes the following steps:

S510. A client sends an on-chain transaction request to an endorsement node.

For ease of description, an example in which the client sends the on-chain transaction request to the endorsement node is used for description.

It should be understood that the client creates a transaction, and sends the on-chain transaction request to an endorsement node set selected by the transaction, where the endorsement node set includes at least one endorsement node. The client may simultaneously send on-chain transaction requests to the endorsement nodes in the endorsement node set, or the client may not simultaneously send on-chain transaction requests to the endorsement nodes in the endorsement node set. In at least one embodiment of this application, how the client creates data and how the client sends the on-chain transaction request to the endorsement node in the endorsement node set are not limited. For details, refer to descriptions in a current related technology. Details are not described herein.

The on-chain transaction request includes a smart contract identifier (smart contract ID), transaction content (TX content), and a signature (sign).

Specifically, the smart contract identifier may also be referred to as an identifier, and is used to specify a second node set corresponding to the transaction. It should be understood that the identifier used to specify the second node set may alternatively be in another form. The smart contract ID shown in at least one embodiment is merely an example, and does not constitute any limitation on the protection scope of this application.

A difference between a consortium blockchain in at least one embodiment of this application and the consortium blockchain shown in FIG. 3 lies in that the consortium blockchain in at least one embodiment of this application includes a second node (which may also be referred to as an editing node). The editing node defined in at least one embodiment of this application is first described.

The editing node is a node that has permission to modify a block and has chameleon public and private key slices in the consortium blockchain.

An editing node set includes a plurality of editing nodes, and may be understood as a set of nodes that can jointly perform editing work. One or more editing node sets may be set in the consortium blockchain. Each editing node set ID is in one-to-one correspondence with an editing node list.

For example, an editing node set #1 includes {a node #a, a node #b, a node #c}. A chameleon hash algorithm is as follows:

The node #a generates a private key slice $tk_a = x_a$, and calculates a public key slice $hk_a = g\hat{}x_a$.

The node #b generates a private key slice $tk_b = x_b$, and calculates a public key slice $hk_b = g\hat{}x_b$.

The node #c generates a private key slice $tk_c = x_c$, and calculates a public key slice $hk_c = g\hat{}x_c$.

The node #a reserves the private key slice $tk_a$, the node #b reserves the private key slice $tk_b$, and the node #c reserves the private key slice $tk_c$. The node #a broadcasts the public key slice $hk_a$ in the blockchain, the node #b broadcasts the public key slice $hk_b$ in the blockchain, and the node #c broadcasts the public key slice $hk_c$ in the blockchain. The node #a, the node #b, and the node #c may calculate a system public key $hk = g\hat{}(x_a \cdot x_b \cdot x_c)$ and a private key of the editing node set #1 is $t_k = \{x_a, x_b, x_c\}$.

The foregoing is described merely by using an example in which the editing node set #1 is set in the consortium blockchain, and does not constitute any limitation on the protection scope of this application. An editing node set #2 and/or an editing node set #3 may be further set in the consortium blockchain. The editing node set #2 includes {node m, node n, node t}, and the editing node set #3 includes {node m, node n, node t}.

For ease of understanding, the following describes an example in which the second node set corresponding to the transaction is the foregoing editing node set #1.

For example, an editing node set #1, an editing node set #2, and an editing node set #3 are set in a consortium blockchain. An identifier of the editing node set #1 is an editing node set ID #1, and the editing node set ID #1 corresponds to a node #a, a node #b, and a node #c. An identifier of the editing node set #2 is an editing node set ID #2, and the editing node set ID #2 corresponds to a node #e, a node #f, and a node #g. An identifier of the editing node set #3 is an editing node set ID #3, and the editing node set ID #3 corresponds to a node #h, a node #i, and a node #j. The identifier may be the editing node set ID #1, indicating the node #a, the node #b, and the node #c.

Further, after receiving the on-chain transaction request, the endorsement node performs the following steps S520 to S550:

S520. Verify a signature.

In this application, how the endorsement node verifies the signature of the on-chain transaction request is not limited. For details, refer to descriptions of an endorsement procedure in a current related technology.

S530. Verify whether a channel access control list (access control list, ACL) is conformed to.

In this application, how the endorsement node verifies whether the channel ACL is conformed to is not limited either. For details, refer to the descriptions of the endorsement procedure in the current related technology.

S540. The endorsement node determines whether endorsement on the on-chain transaction request succeeds.

This application mainly relates to that the endorsement on the on-chain transaction request succeeds. When the endorsement on the on-chain transaction request succeeds, the endorsement node generates an endorsement result: simulating a transaction, performing chameleon hash calculation by using a public key hk corresponding to an ID of a second node set specified in the transaction, and signing a signature.

S550. The endorsement node sends the endorsement result to the client.

After receiving plenty of endorsement results returned by a first node (the endorsement node), the client performs the following operations:

S560. Construct a transaction request.

S570. Send the transaction request to a sorting node.

After receiving the transaction request, the sorting node performs the following operations:

S580. Perform sorting to generate a block.

S590. Synchronize the block to a master node.

Finally, each accounting node in the blockchain performs the following operations:

S591. Verify the block, synchronize a local blockchain, and write a new transaction.

For specific descriptions of S560 to S591, refer to descriptions of the current related technology. Details are not described in this application. This application mainly relates to a procedure that needs to be performed when the transaction is subsequently modified in the consortium blockchain after the transaction is written. The following describes in detail the method for editing a blockchain provided in this application with reference to FIG. 6.

Figure 6:
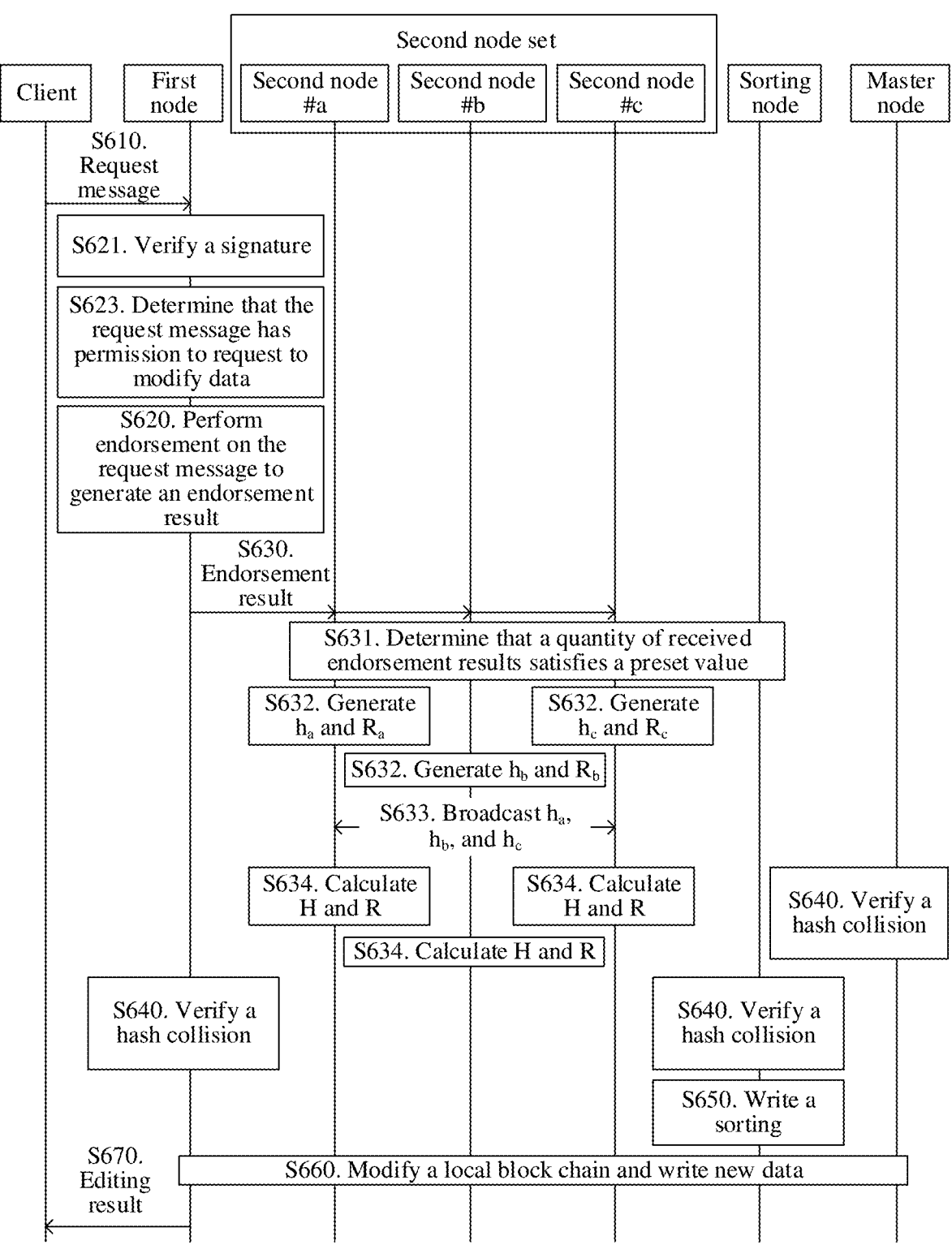
FIG. 6 is a schematic flowchart of a method for editing a blockchain according to this application.

FIG. 6 is a schematic flowchart of a method for editing a blockchain according to this application.

The method for editing a blockchain provided in embodiments of this application may be applied to a consortium blockchain for editing the consortium blockchain, or may be applied to a public blockchain or a private blockchain.

Specifically, the blockchain in embodiments of this application includes at least one endorsement node, for example, an endorsement node defined in the consortium blockchain mentioned in the current related technology. For another example, a node that can be used to implement an endorsement function may be defined in the public blockchain or the private blockchain.

In embodiments of this application, whether the endorsement node in the blockchain is currently existing or newly added is not limited, provided that the blockchain includes at least one node that can implement the endorsement function.

For ease of description, the following describes a consortium blockchain-based blockchain data editing method as an example. Editing of data in another type of blockchain is similar to editing of data in the consortium blockchain. Details are not described in this application.

The method for editing a blockchain includes at least some of the following steps:

S610. A first node receives a request message, where the request message is used to request to edit data.

For example, the data involved in this application includes a transaction or a block, and the first node is any one of a plurality of nodes with an endorsement function in a blockchain.

In a possible implementation, the first node receives the request message from a client, or a client sends the request message to the first node.

Specifically, the client determines that data needs to be edited, and sends the request message to an endorsement node set selected for the data, where the endorsement node set includes the first node. The client may simultaneously send first request messages to endorsement nodes in the endorsement node set, or the client may not simultaneously send first request messages to endorsement nodes in the endorsement node set. In embodiments of this application, how the client creates the data and how the client sends the request messages to the endorsement nodes in the endorsement node set are not limited. For details, refer to descriptions in a current related technology. Details are not described herein.

It should be noted that, for ease of description, in embodiments of this application, an example in which the client sends the request message to the first node is used for description. The client may further send the request message to another endorsement node (for example, a second endorsement node and/or a third endorsement node) in the endorsement node set. Steps performed by the another endorsement node to receive the request message and steps performed by the another endorsement node based on the request message are similar to the steps performed by the first node to receive the request message and steps performed by the first node. Details are not described in this application.

The request message may be referred to as a data editing request message, or may be referred to as a propose (propose) message. The request message is used to request the first node to edit data.

For example, the client in embodiments of this application may be an application or a user.

For example, the request message includes an identifier, where the identifier identifies a second node set corresponding to the foregoing data, and the second node set includes at least one second node.

It should be understood that the at least one second node corresponding to the data in embodiments of this application refers to an editing node that can edit the data.

In a possible implementation, the identifier may indicate an identifier (identifier, ID) of each of the at least one second node corresponding to the data.

Alternatively, in another possible implementation, the identifier indicates a smart contract identifier (smart contract ID) corresponding to the data.

Alternatively, in still another possible implementation, the identifier indicates an identifier of a second node set to which the at least one second node corresponding to the data belongs.

Optionally, the request message further includes data content (content) and a signature (signature), and the signature information is for protecting the request message.

The request message in embodiments of this application may be understood as a propose message sent by the client to the endorsement node in a current blockchain technology. A difference is that the request message in embodiments of this application includes the foregoing identifier, but the propose message does not include an identifier for identifying the editing node. Therefore, the request message in embodiments of this application may reuse a current propose message, and add an identifier to the propose message, or reuse existing information in the propose message to identify the editing node.

After receiving the foregoing request message, the first node needs to perform endorsement on the request message to generate an endorsement result. The method procedure shown in FIG. 6 further includes the following steps:

S620. The first node performs endorsement on the request message to generate the endorsement result.

After receiving the request message, the first node determines whether endorsement succeeds; and if the endorsement succeeds, generates an endorsement result: simulating a transaction, performing hash calculation by using a public key corresponding to an identifier of a second node set specified in data, and signing a signature.

It should be noted that the endorsement node further needs to verify the signature of the request message and verify whether a channel ACL is conformed to. The method procedure shown in FIG. 6 further includes the following steps:

S621. Verify a signature.

How the first node verifies the signature of the request message is not limited in this application. For details, refer to descriptions of an endorsement procedure in the current related technology.

S622. Verify whether a channel ACL is conformed to.

In this application, how the first node verifies whether the channel ACL is conformed to is not limited either. For details, refer to the descriptions of the endorsement procedure in the current related technology.

For example, the first node further needs to determine whether the request message has permission to request to modify data. The method procedure shown in FIG. 6 further includes the following steps:

S623. Determine that the request message has permission to request to modify data.

For example, the first node determines that the client that sends the request message has the permission to modify the data. Specifically, the client may be a client that initiates a data on-chain request.

For another example, the first node verifies the signature of the request message, and if the verification succeeds, determines that the request message has the permission to request to modify the data.

Further, the first node needs to send the endorsement result to the editing node. The method procedure shown in FIG. 6 further includes the following steps:

S630. The first node sends the endorsement result to each of the at least one second node.

The at least one second node belongs to the second node set, and the second node has an editing function. Each of the at least one second node knows a private key slice corresponding to the second node and a public key corresponding to the second node set, and the public key is determined based on at least one public key slice respectively corresponding to the at least one second node.

Specifically, before the first node sends the endorsement result to each of the at least one second node, the second node set may be determined in the following manner.

Manner 1: The first node determines the second node set based on the data.

For example, the first node determines a second node set obtained during the data on-chain process as the second node set.

Manner 2: The first node determines the second node set based on the identifier, where the identifier is carried in the request message, and the identifier indicates the second node set.

Further, a second node in the second node set is used as an example to describe steps that need to be performed after the second node receives the endorsement result.

S631. The second node determines that a quantity of received endorsement results satisfies a preset value.

For example, a plurality of first nodes all perform the foregoing endorsement procedure, and each first node sends an endorsement structure to each of the second node in the second node set.

S632. Calculate a second hash value hi and a second random number Ri that correspond to the second node.

After determining that plenty of endorsements of the endorsement node are received, the second node calculates, by using the private key, the second hash value and the second random number that correspond to the second node.

For example, the second node set includes {a second node #a, a second node #b, a second node #c}, and an algorithm for calculating the second hash value hi and the second random number Ri is as follows:

The second node #a generates a second hash value $h_a$ and a second random number $R_a$, where $h_a$=chameleon(m, $tk_a$).

The second node #b generates a second hash value $h_b$ and a second random number $R_b$, where $h_b$=chameleon(m, $tk_b$).

The second node #c generates a second hash value $h_e$ and a second random number $R_c$, where $h_c$=chameleon(m, $tk_c$).

S633. Broadcast the calculated second hash value and second random number to other second nodes in the second node set.

S634. Calculate a first hash value H and a first random number R.

The second node calculates the first hash value and the first random number based on the second hash value and the second random number that correspond to the second node, and a second hash value and a second random number that correspond to each of the other second nodes in the second node set. $H=h_a$ & $h_b$ & $h_c$.

After the second node performs S631 to S63, the method procedure shown in FIG. 6 further includes the following steps:

S640. Other nodes in a blockchain verify a hash collision.

How a node verifies the hash collision is not limited in this application. For details, refer to descriptions of the hash collision in the current related technology.

S650. A sorting node writes a sorting.

In this application, how the sorting node writes the sorting is not limited. For details, refer to descriptions of sorting performed by the sorting node in the current related technology.

After the sorting node performs sorting, the method procedure shown in FIG. 6 further includes the following steps:

S660. Modify a local blockchain and write new data.

Optionally, an editing history record of the blockchain may be further recorded.

Further, an editing result may be returned to the client. The method procedure shown in FIG. 6 further includes the following steps:

S670. Send an editing result to the client.

For example, the editing result may be indication information for successful editing; or the editing result may be an editing response message.

In the foregoing method embodiments, the sequence numbers of the foregoing processes do not mean execution sequences. The execution sequences of the processes should be determined based on functions and internal logic of the processes, and should not be construed as any limitation on the implementation processes of embodiments of this application. In addition, not all operations in the foregoing method embodiments need to be performed.

It should be understood that each node in the foregoing method embodiments may perform some or all of the steps in embodiments. These steps or operations are merely examples. Embodiments of this application may further include performing other operations or variations of various operations.

It may be understood that, in the foregoing method embodiments, the method implemented by the first node may also be implemented by a component (for example, a chip or a circuit) that may be used for the first node, and the method implemented by the second node may also be implemented by a component that may be used for the second node.

It should further be understood that, in embodiments of this application, unless otherwise stated or there is a logic conflict, terms and/or descriptions in different embodiments are consistent and may be mutually referenced, and technical features in different embodiments may be combined based on an internal logical relationship thereof, to form at least one new embodiment.

The foregoing describes in detail the method for editing a blockchain in embodiments of this application with reference to FIG. 5 and FIG. 6. The following describes in detail apparatuses for editing a blockchain provided in embodiments of this application with reference to FIG. 7 to FIG. 12.

Figure 7:
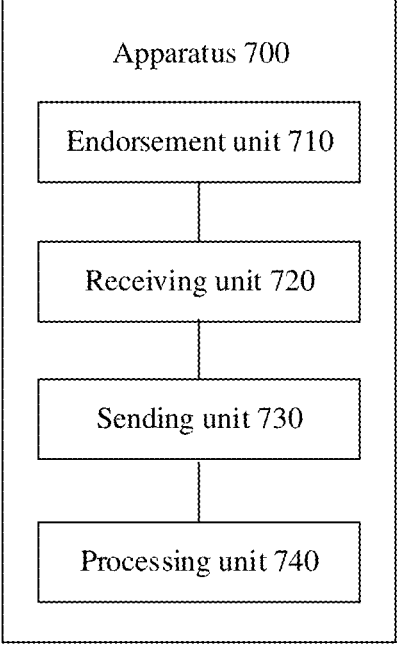
FIG. 7 is a schematic diagram of an apparatus 700 for editing a blockchain according to this application.

FIG. 7 is a schematic diagram of an apparatus 700 for editing a blockchain according to this application. As shown in FIG. 7, the apparatus 700 includes an endorsement unit 710, a receiving unit 720, and a sending unit 730.

The receiving unit 720 is configured to receive a request message, where the request message is used to request to edit data, and the data includes a transaction or a block.

The endorsement unit 710 is configured to perform endorsement on the request message to generate an endorsement result.

The sending unit 730 is configured to send the endorsement result to each of at least one second node, where the at least one second node belongs to a second node set.

The first node is any one of a plurality of nodes with an endorsement function in a blockchain.

Each of the at least one second node knows a private key slice corresponding to the second node and a public key corresponding to the second node set, and the public key is determined based on at least one public key slice respectively corresponding to the at least one second node.

The apparatus further includes a processing unit 740.

The processing unit 740 is configured to determine that the request message has permission to request to modify the data.

Optionally, the endorsement unit 710 and the processing unit 740 may be one unit, and may implement an endorsement function and a processing function. In some embodiments, at least one of the endorsement unit 710 or the processing unit 740 comprises a chip or processor.

The apparatus 700 completely corresponds to the first node in the method embodiments. The apparatus 700 may be the first node in the method embodiments; or the apparatus 700 may be a chip or a functional module in the first node in the method embodiments. A corresponding unit of the apparatus 700 is configured to perform corresponding steps performed by the first node in the method embodiment(s) described with respect to FIG. 5 or FIG. 6.

The processing unit 740 in the apparatus 700 performs steps implemented or processed inside the first node in the method embodiments. The receiving unit 720 performs the receiving steps of the first node in the method embodiments. The sending unit 730 performs the sending steps of the first node in the method embodiments. The sending unit 730 and the receiving unit 720 may form a transceiver unit, and have both receiving and sending functions. The sending unit 730 may be a transmitter, and the receiving unit 720 may be a receiver. The receiver and the transmitter may be integrated to constitute a transceiver.

FIG. 8 is a schematic structural diagram of a first node applicable to at least one embodiment of this application. For ease of description, FIG. 8 shows only main components of the first node. As shown in FIG. 8, the first node includes a processor 810, a memory 820, and a transceiver 830. The processor is configured to control the transceiver to receive and send information. The memory is configured to store a computer program. The processor is configured to invoke the computer program from the memory and run the computer program, to perform a corresponding procedure and/or operation performed by the first node in the method for editing a blockchain provided in this application. Details are not described herein.

A person skilled in the art may understand that, for ease of description, FIG. 8 shows only one memory and one processor. In an actual system, there may be a plurality of processors and memories. The memory may also be referred to as a storage medium, a storage device, or the like. This is not limited in embodiments of this application.

FIG. 9 is a schematic diagram of an apparatus 900 for editing a blockchain according to this application. As shown in FIG. 9, the apparatus 900 includes a processing unit 910, a receiving unit 920, and a sending unit 930.

The processing unit 910 is configured to generate a private key slice and a public key slice that correspond to a second node.

The sending unit 930 is configured to send the public key slice corresponding to the second node to other second nodes than the second node in the second node set.

The receiving unit 920 is configured to receive a public key slice that corresponds to each of the other second nodes and that is sent by the other second nodes than the second node in the second node set.

The processing unit 910 is further configured to calculate a public key corresponding to the second node set based on a public key slice corresponding to each of the at least one second node in the second set.

The sending unit is further configured to send the public key to nodes in the blockchain.

The apparatus 900 completely corresponds to the second node in the method embodiments. The apparatus 900 may be the second node in the method embodiments, or the apparatus 900 may be a chip or a functional module in the second node in the method embodiments. A corresponding unit of the apparatus 900 is configured to perform corresponding steps performed by the second node in the method embodiment(s) described with respect to FIG. 5 or FIG. 6.

The processing unit 910 in the apparatus 900 performs steps implemented or processed inside the second node in the method embodiments. The receiving unit 920 performs the receiving steps of the second node in the method embodiments. The sending unit 930 performs the sending steps of the second node in the method embodiments. The sending unit 930 and the receiving unit 920 may form a transceiver unit, and have both receiving and sending functions. The sending unit 930 may be a transmitter, and the receiving unit 920 may be a receiver. The receiver and the transmitter may be integrated to constitute a transceiver. In some embodiments, the processing unit 910 comprises a chip or processor.

FIG. 10 is a schematic structural diagram of a second node applicable to at least one embodiment of this application. For ease of description, FIG. 10 shows only main components of the second node. As shown in FIG. 10, the second node includes a processor 1010, a memory 1020, and a transceiver 1030. The processor is configured to control the transceiver to receive and send information. The memory is configured to store a computer program. The processor is configured to invoke the computer program from the memory and run the computer program, to perform a corresponding procedure and/or operation performed by the second node in the method for editing a blockchain provided in this application. Details are not described herein again.

A person skilled in the art may understand that, for ease of description, FIG. 10 shows only one memory and one processor. In an actual system, there may be a plurality of processors and memories. The memory may also be referred to as a storage medium, a storage device, or the like. This is not limited in embodiments of this application.

FIG. 11 is a schematic diagram of an apparatus 1100 for editing a blockchain according to this application. As shown in FIG. 11, the apparatus 1100 includes a receiving unit 1110 and a sending unit 1120.

The sending unit 1120 is configured to send a request message to each of a plurality of nodes, where the request message is used to request to edit data, the data includes a block or a transaction, the request message includes an identifier, and the identifier indicates a second node set.

The receiving unit 1110 is configured to receive a response message from each of the plurality of nodes, where the response message includes an editing result corresponding to the data.

The second node set includes at least one second node, each of the at least one second node knows a private key slice corresponding to the second node and a public key corresponding to the second node set, and the public key is determined based on at least one public key slice respectively corresponding to the at least one second node.

The apparatus 1100 completely corresponds to the client in the method embodiments. The apparatus 1100 may be the client in the method embodiments, or the apparatus 1100 may be a chip or a functional module in the client in the method embodiments. A corresponding unit of the apparatus 1100 is configured to perform corresponding steps performed by the client in the method embodiment(s) described with respect to FIG. 5 or FIG. 6.

The apparatus 1100 may further include a processing unit, configured to perform steps implemented or processed inside the client in the method embodiments. The receiving unit 1110 performs the receiving steps of the client in the method embodiments. The sending unit 1120 performs the sending steps of the client in the method embodiments. The sending unit 1120 and the receiving unit 1110 may form a transceiver unit, and have both receiving and sending functions. The sending unit 1120 may be a transmitter, and the receiving unit 1110 may be a receiver. The receiver and the transmitter may be integrated to constitute a transceiver.

FIG. 12 is a schematic structural diagram of a client applicable to at least one embodiment of this application. For ease of description, FIG. 12 shows only main components of the client. As shown in FIG. 12, the client includes a processor 1210, a memory 1220, and a transceiver 1230. The processor is configured to control the transceiver to receive and send information. The memory is configured to store a computer program. The processor is configured to invoke the computer program from the memory and run the computer program, to perform a corresponding procedure and/or operation performed by the client in the method for editing a blockchain provided in this application. Details are not described herein again.

A person skilled in the art may understand that, for ease of description, FIG. 12 shows only one memory and one processor. In an actual system, there may be a plurality of processors and memories. The memory may also be referred to as a storage medium, a storage device, or the like. This is not limited in embodiments of this application.

At least one embodiment of this application further provides a blockchain, including the first node and the second node.

This application further provides a non-transitory computer-readable storage medium. The computer-readable storage medium stores instructions. When the instructions are run on a computer, the computer is enabled to perform the method shown in FIG. 5 or FIG. 6.

This application further provides a computer program product including instructions. When the computer program product runs on a computer, the computer is enabled to perform the method shown in FIG. 5 or FIG. 6.

This application further provides a chip, including a processor. The processor is configured to read and run a computer program stored in a memory, to perform the method for editing a blockchain provided in this application. Optionally, the chip further includes the memory. The memory is connected to the processor through a circuit or a wire. The processor is configured to read and execute the computer program in the memory. Further, optionally, the chip further includes a communication interface, and the processor is connected to the communication interface. The communication interface is configured to receive data and/or information that needs to be processed. The processor obtains the data and/or the information from the communication interface, and processes the data and/or the information. The communication interface may be an input/output interface, an interface circuit, an output circuit, an input circuit, a pin, a related circuit, or the like in the chip. The processor may alternatively be a processing circuit or a logic circuit.

It should be understood that the chip may alternatively be replaced with a chip system. Details are not described herein again.

In this application, the terms "include" and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, product, or device.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a non-transitory computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of editing a blockchain, comprising:
receiving, by a first node, a request message, wherein the request message requests to edit data, and the data comprise a transaction or a block in the blockchain;
performing, by the first node, endorsement on the request message to generate an endorsement result; and sending, by the first node, the endorsement result to each of one or more second nodes in a second node set, wherein
the first node is any one of a plurality of first nodes configured to perform an endorsement function in the blockchain,
each of the one or more second nodes is configured to perform an editing function in the blockchain,
each of the one or more second nodes knows a private key slice corresponding to the second node, and a public key corresponding to the second node set,
the public key is determined based on one or more public key slices each respectively corresponding to one of the one or more second nodes, and
the method further comprises verifying, by the first node, a hash collision based on a first hash value and a first random number, wherein
the first hash value and the first random number are obtained based on one or more second hash values and one or more second random numbers, and
each of the one or more second nodes is configured to calculate, based on the private key slice corresponding to the second node,
one of the one or more second hash values, and
one of the one or more second random numbers.

2. The method according to claim 1, wherein the method further comprises:
determining, by the first node, that the request message has permission to request to edit the data.

3. The method according to claim 1, wherein before the sending, by the first node, the endorsement result to each of the one or more second nodes, the method further comprises:
determining, by the first node, the second node set based on
the data, or
an identifier, wherein the identifier is carried in the request message, and the identifier indicates the second node set.

4. The method according to claim 1, wherein before the receiving, by the first node, the request message, the method further comprises:
receiving, by the first node, the data; and
verifying, by the first node, the data based on the public key, wherein the verifying comprises performing hash calculation and signing based on the public key.

5. The method according to claim 4, wherein before the verifying, by the first node, the data based on the public key, the method further comprises:
determining, by the first node, the second node set; and
determining, by the first node, the public key based on the second node set.

6. The method according to claim 5, wherein the determining, by the first node, the second node set comprises:
determining, by the first node, the second node set based on
preconfigured information, wherein the preconfigured information indicates that the data correspond to the second node set, or
an identifier carried in the request message, wherein the identifier indicates the second node set.

7. The method according to claim 1, wherein the method further comprises:
sending, by the first node, a response message to a client that sent the request message, wherein the response message comprises an editing result corresponding to the data.

8. The method according to claim 1, wherein the blockchain comprises a consortium blockchain.

9. A method of editing a blockchain, comprising:

sending, by a client, a request message to each of a plurality of first nodes, wherein the request message requests to edit data, the data comprise a block or a transaction in the blockchain, the request message comprises an identifier, and the identifier indicates a second node set; and receiving, by the client, a response message from each of the plurality of first nodes, wherein the response message comprises an editing result corresponding to the data, wherein each of the plurality of first nodes is configured to perform an endorsement function in the blockchain, the second node set comprises one or more second nodes each of which is configured to perform an editing function in the blockchain, each of the one or more second nodes knows a private key slice corresponding to the second node, and a public key corresponding to the second node set, the public key is determined based on one or more public key slices each respectively corresponding to one of the one or more second nodes, each of the plurality of first nodes is configured to perform endorsement on the request message to generate an endorsement result, send the endorsement result to each of the one or more second nodes in the second node set, and verify a hash collision based on a first hash value and a first random number, the first hash value and the first random number are obtained based on one or more second hash values and one or more second random numbers, and each of the one or more second nodes is configured to calculate, based on the private key slice corresponding to the second node, one of the one or more second hash values, and one of the one or more second random numbers.

10. The method according to claim 9, wherein before the sending, by the client, the request message to each of the plurality of first nodes, the method further comprises:

sending, by the client, the data to each of the plurality of first nodes; and receiving, by the client, a verification result from each of the plurality of first nodes, wherein the verification result comprises a result of performing hash calculation and signing based on the public key.

11. A method of editing a blockchain, wherein the blockchain comprises a second node set, the second node set comprises a plurality of second nodes each of which is configured to perform an editing function in the blockchain, the method is performed by each second node of the plurality of second nodes, and the method comprises:

generating, by the second node, a private key slice and a public key slice that correspond to the second node;

sending, by the second node, the public key slice corresponding to the second node to other second nodes than the second node in the second node set;

receiving, by the second node, a public key slice that corresponds to each of the other second nodes and that is sent by said each of the other second nodes;

calculating, by the second node, a public key corresponding to the second node set based on the public key slice corresponding to each of the plurality of second nodes in the second node set;

sending, by the second node, the public key to a plurality of nodes in the blockchain;

receiving, by the second node, an endorsement result that is of a request message and that is sent by each of a plurality of first nodes, wherein each of the plurality of first nodes is configured to perform an endorsement function in the blockchain, the request message requests to edit data, and the data comprise a transaction or a block in the blockchain;

in response to determining that a quantity of the received endorsement results satisfies a preset value, calculating, by the second node based on the private key slice corresponding to the second node, a second hash value and a second random number that correspond to the second node;

receiving, by the second node, a second hash value and a second random number that correspond to each of the other second nodes and that are sent by said each of the other second nodes:

calculating, by the second node, a first hash value and a first random number based on the second hash value and the second random number that correspond to each of the plurality of second nodes in the second node set; and sending, by the second node, the first hash value and the first random number to the plurality of first nodes in the blockchain, wherein each of the plurality of first nodes is configured to verify a hash collision based on the first hash value and the first random number.

* * * * *